April 22, 1924.
G. O. HOLBEN
TOOL
Filed July 20, 1922
1,491,479
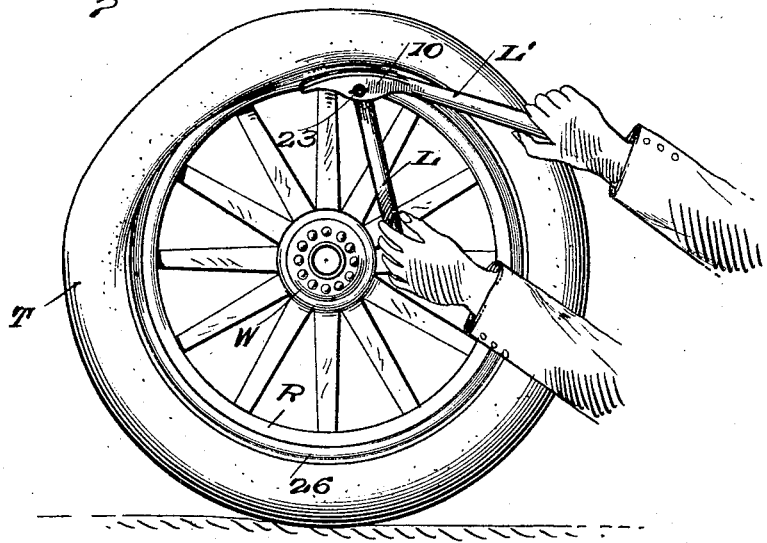
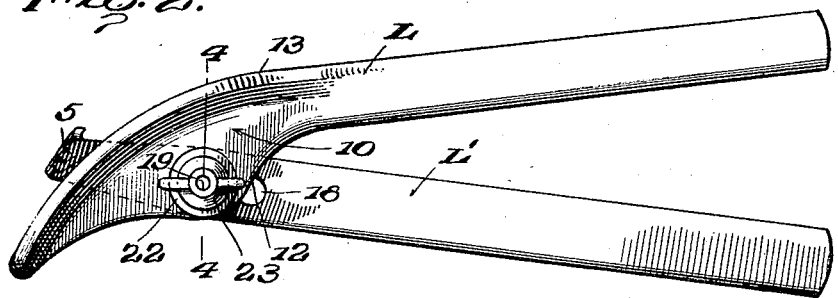
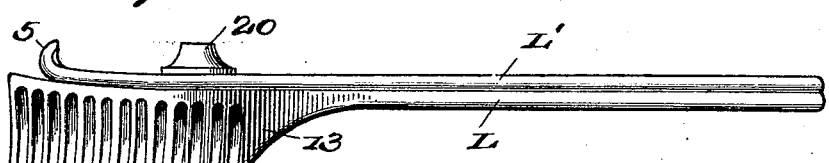
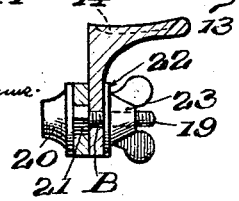
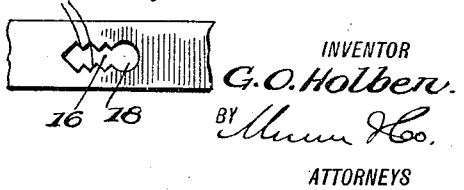

Patented Apr. 22, 1924.

1,491,479

UNITED STATES PATENT OFFICE.

GEORGE OLIVER HOLBEN, OF ALLENTOWN, PENNSYLVANIA.

TOOL.

Application filed July 20, 1922. Serial No. 576,282.

*To all whom it may concern:*

Be it known that I, GEORGE O. HOLBEN, a citizen of the United States, and a resident of Allentown, in the county of Lehigh and State of Pennsylvania, have invented certain new and useful Improvements in Tools, of which the following is a specification.

This invention relates to a tool.

The invention more particularly relates to a tool for mounting pneumatic tires of the clincher type on wheel rims, and has for its object to provide a tool of this character by which a tire may be mounted in an easy and exceedingly expeditious manner.

It is also an object of the invention that the tool eliminate any possibility of puncturing an inner tube when mounting a tire.

It is also within the scope of the objects of invention that the tool be simple in construction and inexpensive to manufacture.

Other objects relating to details of construction will hereinafter appear.

The invention is illustrated by way of example in the accompanying drawings, in which:

Figure 1 is a view in side elevation illustrating the application of the tool,

Figure 2 is a view in side elevation of the tool,

Figure 3 is a top plan view of the same,

Figure 4 is a transverse sectional view taken on the lines 4—4 of Figure 2, and

Figure 5 is a fragmentary view in side elevation of one of the members of the tool.

Referring to the drawings more particularly, the tool briefly consists in two bars L and L', and a pivot or fulcrum bolt B.

More specifically the bar L is rectangular in cross-section and terminates adjacent its one end in an arcuate portion 10 which has an enlargement 12 upon its one edge, and which has formed upon its opposite edge a laterally extending flange 13. The flange 13 substantially corresponds in shape to the inner periphery of a pneumatic tire casing and has its upper surface formed with transversely extending ribs 14 to provide a gripping surface.

The bar L' may be rectangular in cross section similar to the bar L. This bar terminates at its one end in a hook 5 which extends laterally therefrom and in the direction shown. Adjacent the end of bar L' having the hook 5 there is formed an elongated slot 16 having its sides serrated as at 17 and one end of the slot preferably terminating in a circular opening 18 which may be brought into register with a similar opening 19 in bar L. The bolt B is adapted to be projected through the openings 18 and 19 of the bars L and L' respectively, and is formed with a head 20 adjacent which there is provided a squared portion 21. Diagonal corners of portion 21 may be brought into aligned serrations 17 for adjusting the position of bar L and a washer 22 and wing nut 23 are employed for holding the bolt B in adjusted position.

In Figure 1 W indicates generally a wheel of which R is the rim and T a tire to be placed upon this rim. The tire T has the usual clincher beads 26 which are adapted to cooperate with the rim for holding the tire in place when the tire is properly mounted upon the rim. In mounting the tire the same is placed as illustrated. The tool described is now employed for completing the mounting of the tire, and this operation is as follows: The hook 15 of lever bar L' is engaged with clincher flange of the rim and the lever bars are grasped as shown, whereby to bring the curved flange 13 of lever bar L beneath the associated clincher bead of tire casing T and then in an obvious manner expand the tire and slip the same in position upon the rim R. The operation may be made in a very short interval of time, and there is no possibility of puncturing the inner tube of tire. This statement is also thought to be apparent.

The degree of leverage of the lever arm L may be changed through manipulating the bolt B and due to the simplicity of arrangement, this adjustment can be done in an instant of time.

What I claim is:

A tool comprising a pair of bar members pivotally connected adjacent similar ends thereof, one of said bars terminating at its pivoted end and upon its exterior edge with relation to the other bar member in an arcuate shaped portion, and the arcuate shaped portion having formed upon its one edge a laterally and outwardly extending flange, said flange having its outer face or surface provided with transverse grooves, and the last named bar member being provided with a protrusion in substantial radial alinement with the arcuate shaped portion thereof, a pivot connection between the protrusion and the other bar, and a hook formed upon the pivoted end of the last named bar.

GEORGE O. HOLBEN.